LOGICAL BINARY POWERING CIRCUITS

Filed Oct. 8, 1956 3 Sheets-Sheet 1

INVENTOR.
J. Robert Logan
BY
Charles E. English
AGENT

INVENTOR.
J. Robert Logan
BY
Charles G. English
AGENT

INVENTOR.
J. Robert Logan
BY
Charles E. English
AGENT

United States Patent Office 2,890,829

Patented June 16, 1959

2,890,829

LOGICAL BINARY POWERING CIRCUITS

J Robert Logan, Norristown, Pa., assignor to Sperry Rand Corporation, New York, N.Y., a corporation of Delaware Application October 8, 1956, Serial No. 614,633

22 Claims. (Cl. 235—164)

The present invention relates to computation circuits, particularly of the type operating in the binary system of notation, and is primarily concerned with improved circuits of simplified construction for rapidly deriving the binary power, such as the binary square or binary cube, of any binary number. The present invention is further concerned with achieving such binary powers, such as squares and cubes, through the utilization of simpler circuits than those suggested heretofore.

In various logical computations, it is often required that a number be raised to a power thereof, and in practice, it has been found that by far the most frequent of such computations involves the taking of the square (and, somewhat less frequently, the cube) of a number. Prior computation systems have, for the most part, derived such squares or cubes through a process of successive additions of the number itself whereby the taking of a square or cube has often consumed a relatively long time, particularly when the number squared comprises a large number of binary digits.

In an effort to avoid this clear disadvantage of prior squaring or cubing circuits, attempts have been made to produce various logical networks adapted to accept a binary number and thereafter to produce a desired power thereof, but such prior circuits have, for the most part, been extremely complex, thereby raising serious questions of possible failure. The present invention serves to obviate the foregoing difficulties, and relates to logical networks adapted to effect a binary power of an input number with fewer additions and in a more simple overall circuit than has been the case heretofore.

Another object of the present invention resides in the provision of binary squaring and cubing circuits comprising a plurality of registers interconnected to accept various factors of a mathematical squaring or cubing process whereby signals in the said registers may be added to produce a desired binary square or cube. In this respect, the present invention is further concerned with such circuits wherein the number of registers employed is reduced to a minimum, and wherein further, the number of additions required is similarly reduced to a minimum.

A still further object of the present invention resides in the provision of improved logical networks adapted electrically to "collapse" the number of register stages required for a binary power-taking process, thereby to effect a more efficient utilization of storage registers during such a process.

Another object of the present invention resides in the provision of logical binary squaring circuits in particular, and binary power-taking circuits in general, which are simpler in construction, more efficient in operation, and less subject to operating failures than has been the case heretofore.

In providing for the foregoing objects and advantages, the present invention contemplates the provision of binary squaring and cubing circuits comprising an input register or a plurality of input lines adapted to receive signals representative of the digits of a binary number which is to be raised to a desired power thereof. The said signals may, in accordance with the present invention, be gated to accumulator means in accordance with mathematical factors of a squared or cubed number, and this gating process is such that the several factors are automatically disposed in appropriate stages or orders of the said accumulator means, in accordance with the various powers of said factors.

In a preferred embodiment of the present invention, the accumulator means may comprise a plurality of intermediate storage registers whereby signals in the aforementioned input register or input lines are gated simultaneously to appropriate stages of the said intermediate storage registers. Such a register arrangement is further associated with a parallel adder adapted thereafter to receive, in sequence, the factor representing signals in the several intermediate storage registers whereby the said parallel adder produces, at its output, a binary train directly representative of the desired power of the binary number originally placed in the aforementioned input register.

When this particular form of the invention is employed, the intermediate registers may be "collapsed" thereby to effect a more efficient utilization of register stages, whereby a minimum number of intermediate storage registers is required; and in addition, this "collapsing" technique permits the desired binary power to be effected with a minimum number of parallel additions, thereby increasing the operating speed of the overall circuit. The aforementioned register "collapsing" is effected, in accordance with the present invention, through the use of improved logical networks which electrically take into account possible binary digits which can occur in various locations of the overall system under any circumstances; and the said logical networks, to be described, in fact may be employed in power-taking circuits adapted to accept binary numbers having any arbitrary number of digits without any increase in complexity of the said collapsing logical networks.

As will become apparent from the subsequent description, the present invention is in fact adapted to effect the binary square of any input binary number having N digits, where N may be either an even or an odd number; and when the register and parallel adder embodiment of the present invention is employed, the circuit can effect the desired binary square through the utilization of K storage registers, where $$K \text{ equals } \frac{N}{2}$$

when N is an even number; and $$K \text{ equals } \frac{N-1}{2}$$

where N is an odd number. Moreover, as will become apparent from the subsequent description, a desired binary square can be effected in accordance with the present invention by $K-1$ parallel additions, and this latter factor indeed produces an appreciable saving in time, e.g. a binary number of 30 or 31 digits may be squared in only 14 parallel additions. Principles similar to those discussed in reference to squaring circuits are also applicable, as will be described, in the production of binary cubing circuits and, in fact, by appropriate application of my invention and of the techniques to be described, circuits adapted to take any binary power (and for that matter, any ternary or other base power) may be readily derived.

The foregoing objects, advantages, construction and operation of the present invention will become more readily apparent from the following description and accompanying drawings, in which.

Figure 1:
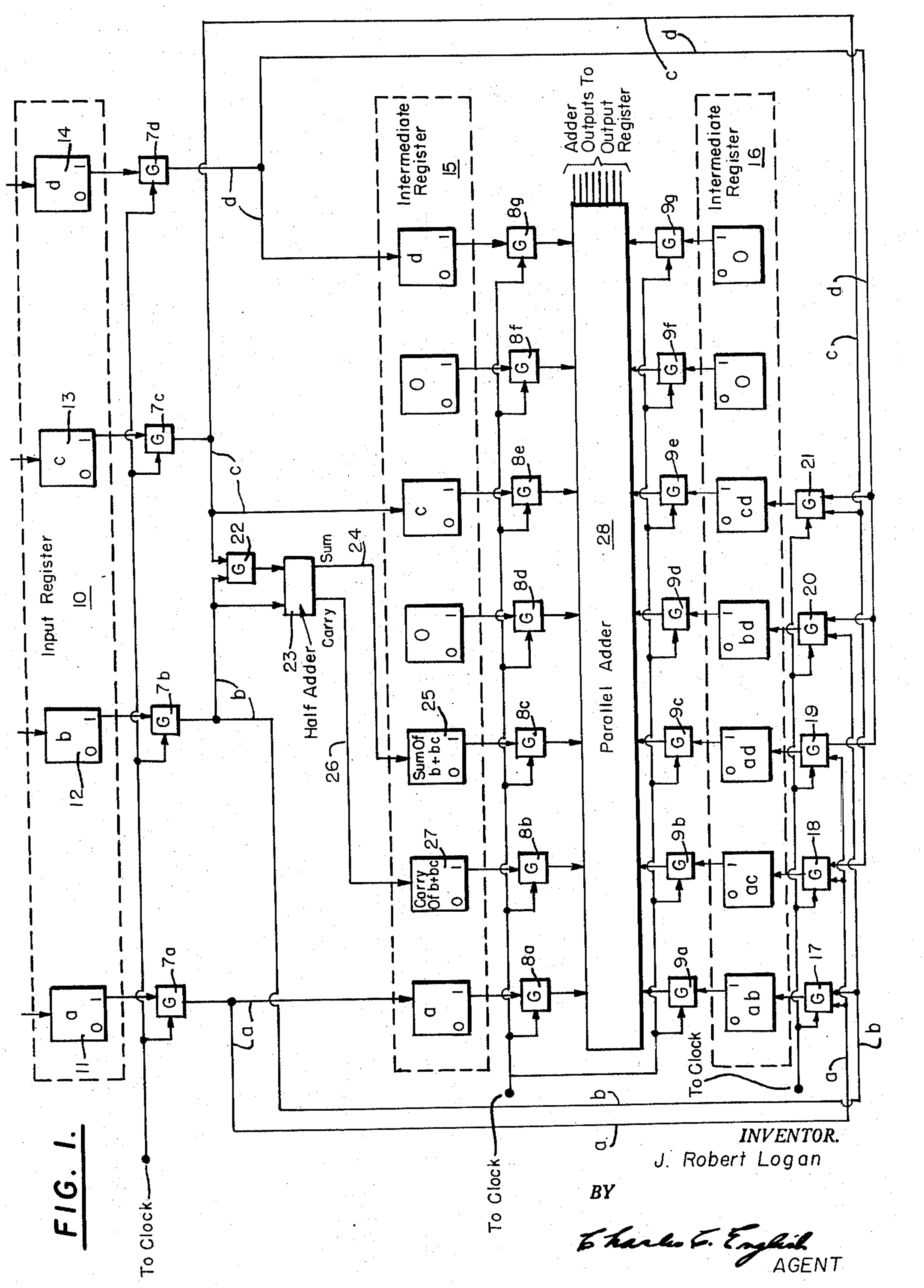
Figure 1 is a logical diagram of one form of binary squaring circuit adapted to effect the binary square of a four-digit number, and illustrates the principles of the present invention which permit the general derivation of any desired binary power, such as squares and cubes.

Before proceeding with a detailed description and analysis of the several representative circuits described above, various definitions of notation to be employed should be recognized. As wlll become apparent from the following description, any number can be represented mathematically by a succession of letters such as "*abcde*," and when such an arbitrary number is meant to denote a binary number, the several letters *a*, *b*, *c*, etc., each comprise either a "1" or a "0." When an input register or a plurality of input lines is adapted to receive such a number, the various digits *a*, *b*, *c*, etc., will ordinarily be disposed in separate stages of the said input register or on separate input lines. As will also be described, the binary digits in such an input register may, in accordance with the present invention, be gated to various register stages, in accordance with logic to be discussed; and the gating technique may utilize means responsive to the presence of a "1" or of a "0" in various stages of the input register. For the most part, during the subsequent discussion (in fact during the entire subsequent discussion except for the representation of digits in the input register), an unbarred letter representation, for example *b*, represents a binary "1" in the *b* place or order of a given register; while a barred letter, for example $\bar{b}$, is meant to represent a binary "0" in the said *b* place or order.

Moreover, as will become apparent from the following description, the gating networks of the present invention are adapted, under some circumstances, to logically combine digits in various orders of the input register; and in this respect therefore, a designation such as "*ab*," at the output of a gate, is meant to represent a condition wherein the said gate produces a "1" output only when two coincident "1's" from the "*a*" and "*b*" orders are applied to the input of the said gate. Similarly, a designation such as $a\bar{b}$ at the output of a gate, is meant to represent a condition wherein the said gate produces a "1" output when the "*a*" input thereto is a "1" and the "*b*" input thereto is a "0" (i.e. $\bar{b}$).

Having recognized the foregoing definitions which are adopted merely for simplicity of explanation, let us now examine the logic, and circuits utilizing such logic, for effecting a desired binary square in accordance with the present invention. It should first be noted that any binary number $(abcd)^2$ may be expressed, to the base 2, as:

$$[a \cdot 2^3 + b \cdot 2^2 + c \cdot 2 + d]^2$$

In determining the square of such a number, the accepted mathematical procedure is to square the individual digits, and to add thereto twice the cross products of the several digits. Such a squaring procedure yields the following factors:

Square of digits: $a^2.2^6$; $b^2.2^4$; $c^2.2^2$; $d^2$ $$\text{Twice cross-products} \begin{cases} 2(ab).2^5 \text{ or } (ab).2^6; \\ 2(ac).2^4 \text{ or } (ac).2^5; \\ 2(ad).2^3 \text{ or } (ad).2^4; \\ 2(bc).2^3 \text{ or } (bc).2^4; \\ 2(bd).2^2 \text{ or } (bd).2^3; \text{ and} \\ 2(cd).2 \text{ or } (cd).2^2 \end{cases}$$

In the binary system, the digits *a*, *b*, *c*, and *d* will be, of course, either "1" or "0." Therefore, in such a binary system, $a^2=a$; $b^2=b$; $c^2=c$; and $d^2=d$.

The individual steps involved in the squaring process of an arbitrary number (*abcd*) may accordingly be set up, as to powers, in a first truth table, as follows:

(1)

| | $2^6$ | $2^5$ | $2^4$ | $2^3$ | $2^2$ | $2^1$ | $2^0$ |
|---|---|---|---|---|---|---|---|
| Step 1 | *a* | 0 | *b* | 0 | *c* | 0 | *d* |
| Step 2 | *ab* | *ac* | *ad* | 0 | 0 | 0 | 0 |
| Step 3 | 0 | 0 | *bc* | *bd* | 0 | 0 | 0 |
| Step 4 | 0 | 0 | 0 | 0 | *cd* | 0 | 0 |

The preceding first table (1) may be collapsed, somewhat, due to the "0's" which always appear in certain places during the squaring computation, and the collapsed second table appears as follows:

(2)

| | $2^6$ | $2^5$ | $2^4$ | $2^3$ | $2^2$ | $2^1$ | $2^0$ |
|---|---|---|---|---|---|---|---|
| Register 1 | *a* | 0 | *b* | 0 | *c* | 0 | *d* |
| Register 2 | *ab* | *ac* | *ad* *bc* | *bd* | *cd* | 0 | 0 |

If each of the horizontal rows in the above second table (2) is considered to comprise the stages of a separate storage register, or is considered to comprise a distinct parallel input to an accumulator, it will be noted that, except for the factor *bc*, the squaring of a four-digit number (*abcd*) could be accomplished with only two storage registers and/or with but a single parallel addition. This desirable result (i.e. the reduced number of registers and/or addition steps) can actually be accomplished by logically combining the factors *b* and *bc* in the $2^4$ column of the above table, thereby further collapsing the said table. This logical combination may be effected, for instance through the use of coincident and inhibition type gates, by recognizing the following with respect to the factors *b* and *bc*:

*b* will always be "1" or "0";
*bc* will always be "1" or "0";

Moreover, when *b*="0," *bc* will also be "0" regardless of the value of *c*.

The following further logical truth table may accordingly be set up for the sum of the factors *b* and *bc*:

(3)

| | *b* | *bc* | Sum | Carry |
|---|---|---|---|---|
| Case 1 | 0 | 0 (*c* can be 0 or 1) | 0 | 0 |
| Case 2 | 1 | 0 (*c* must be 0) | 1 | 0 |
| Case 3 | 1 | 1 (*c* must be 1) | 0 | 1 |

In cases 1 and 2, there is no carry (i.e. a carry of "0") whereby the factors *b* and *bc* can readily be logically combined, for example by utilizing the said factors as separate inputs to a coincidence gate. The only possible problem in such a logical combining arrangement arises in case 3 when both *b* and *bc* are "1's," for then a carry of "1" must be taken into account. This carry situation may be readily taken into consideration, however, by logically combining or adding the factors *b* and *bc*, and by thereafter buffing any resultant carry to the next higher order or stage in the first register or accumulator comprising the logical squaring circuit of the present invention; for, referring to the second truth table (2) given above, it will be noted that, in the absence of a carry, such a next higher register stage always contains a "0" (see the $2^5$ stage in the first register representation of the second truth table, above). In particular, it should be noted that the "sum" above can always be represented by the factor $b\bar{c}$ (where $\bar{c}$ equals "0" as opposed to *c* which represents a "1"), and the "carry" above can always be represented by *bc*.

Thus, the factors *b* and *bc* can readily be logically combined thereby to effect the desired collapse of the truth table to a minimum number of registers and/or addition steps in an accumulator, and this logical combining takes into account any carry which might be generated. It should be noted that the carry discussed above is in fact the only carry which need be considered and, moreover, this carry will never be propagated beyond the aforementioned next higher order or stage in a preselected register or accumulator.

A typical example of a logical squaring circuit adapted to provide the square of a number (*abcd*) could therefore comprise a first register adapted to store or set up, in alternate locations, the factors *a, b, c,* and *d,* with the "*b*" stage of this first register including a half adder or other logical network responsive to the relative states of the digits *b* and *c* and adapted, selectively, to insert a carry into the stage between those storing the factors *a* and *b*; a second register, adapted to store or set up, in appropriate stages thereof, the factors *ab, ac, ad, bd,* and *cd*; and a parallel adder adapted to sum the numbers contained in the said registers, the said summation comprising the desired square. In place of the aforementioned half adder, the logical combining circuit may comprise a circuit responsive to the factors *b* and *c* (i.e. *b* and *bc*), and adapted to provide the desired combining of factors by inserting $b\bar{c}$ in a preselected register order, and the factor *bc* in the next higher order. Such circuits will in fact be described subsequently.

It will be appreciated that the foregoing techniques and structures need not be confined to a four-digit number *abcd*, and analogous considerations and structure may be employed, as has been mentioned previously, in effecting the square of any binary number having N digits. The component bits of an input register containing such an N digit number may, in accordance with the techniques described, be gated into K accumulators or storage registers where $$K=\frac{N}{2}$$

when N is an even number, and $$K=\frac{N-1}{2}$$

when N is an odd number, and, as has also been discussed, the digits in the said K accumulators or storage registers may then be combined into the desired binary square by $K-1$ parallel additions; e.g. when N equals either 14 or 15, seven registers and six additions are required; when N equals 6 or 7, three registers and two additions are required, etc. It will further be appreciated, of course, that intermediate storage registers may, if desired, be dispensed with whereby, through the use of an appropriate gating network, the several binary factors discussed above may be gated, at properly spaced times, from a plurality of input lines or from an input register to the several inputs of a parallel adder, whereby as before the sum output of the said parallel adder provides the desired square of the number in the said input register. The use of intermediate storage registers, however, comprises a preferred embodiment of the present invention due to the simplified gating and timing which results from such use.

One binary squaring circuit constructed in accordance with the previous discussion and adapted to effect the binary square of a four-digit binary number, is illustrated in Figure 1. Thus, referring to Figure 1, it will be seen that in accordance with the present invention, an input register 10, comprising four stages, 11 through 14 inclusive, may be adapted to receive, on separate input lines thereto, the several binary digits *a, b, c,* and *d,* representing an input binary number to be squared. The several register stages 11 through 14 may in fact comprise flip-flops or single-step binary counters, and are purely conventional in configuration. Moreover, the several gates, to be described, are similarly of conventional configuration, as are the parallel adders utilized in the several embodiments of the invention. Typical components which may be utilized in the several circuits of the present invention are in fact described in the text "High Speed Computing Devices" by the staff of Engineering Research Associates, 1950, McGraw-Hill Book Company, Inc.

Returning now to Figure 1, it will be seen that the binary squaring circuit further includes a pair of intermediate storage registers 15 and 16, and each of these registers comprises seven stages. Register 15 is adapted to receive the binary numbers *a, c,* and *d,* while register 16 is adapted to receive the binary numbers *ab, ac, ad, bd,* and *cd*; and the combined factors so placed in intermediate register 16 are inserted therein through the provision of a coincidence gating network comprising a plurality of gates 17 through 21 inclusive. It will be noted, for instance, that gate 17 has two inputs thereto derived respectively from the "1" output terminals of input register stages 11 and 12, whereby a "1" is inserted into the *ab* position of register 16 only when the *a* and *b* positions 11 and 12 of input register 10 contain "1's." A similar analysis applies to the *ac, ad* and *bd* positions of the said intermediate register 16.

It will be appreciated from an examination of the symbols in the register stages of registers 15 and 16 that the factors inserted into the several stages correspond essentially to the collapsed second table (2) given previously, except for the second and third stages of intermediate register 15. Moreover, it will be noted that the registers 15 and 16 include dummy stages which always have a binary "0" therein and these latter stages again conform to the representation given previously with respect to the collapsed second table.

As has already been discussed, the normal factors present during the taking of a binary square would, in the absence of other considerations, require an additional intermediate register and an additional addition step to take into account a single factor. Thus, referring to the second collapsed table (2), discussed above, it will be noted that in the absence of other considerations, an entire register would have to be utilized in the circuit of Figure 1 merely to accept the factor *bc* in the $2^4$ position. In order to reduce the number of stages required as well as the number of additions necessary, a further logical network comprising a gate 22 and a half adder 23 is employed. The gate 22 is of the coincidence type and has two inputs supplied, via clock controlled gates *7b* and *7c*, from the "1" outputs of the *b* and *c* orders 12 and 13 of the input register 10, whereby the output of gate 22 represents a logical combining of the factors *b* and *c*. The output of gate 22 may thus be employed as one input to half adder 23, while a second input thereto is derived, via clock controlled gate *7b*, from the "1" output terminal of the *b* order 12 in input register 10. Half adder 23 again may be conventional in configuration and operates to provide a sum output on line 24 which is inserted into stage 25 of intermediate register 15, and the said half adder also acts to provide a carry output on line 26 which is inserted into stage 27 of intermediate register 15. This utilization of gate 22 and half adder 23, interconnected as illustrated, eliminates the necessity of a separate register for the *bc* factor, and further reduces by one the number of additions required.

It should be noted that the carry appearing on line 26 and inserted into register stage 27, is inserted into a stage which would normally have a "0" therein (see the $2^5$ representation of register 1 in the collapsed second table (2) given previously). Therefore, any carry inserted into register stage 27 cannot under any circumstances be propagated beyond the said register stage 27, wherefore, the logical circuit illustrated in Figure 1 effects the desired ultimate collapse of the register in a most efficient manner. It will be appreciated, therefore, that the several stages of registers 15 and 16, disclosed in Figure 1, are adapted to receive respectively either an input digit, a logical combination of two input digits, or a signal representative of the relative states of two input digits; and these several digit signals are directly inserted into the various register stages at appropriate places corresponding to the order of the several factors.

In operation, means are normally supplied for initially clearing each of the stages in registers 10, 15 and 16 to a "0" state. An input number *abcd* is then inserted into input register 10, and the number so disposed in register 10 is thereafter gated simultaneously, under control of a clock signal, to appropriate stages of the intermediate registers 15 and 16. Subsequent to this initial gating step, the signals in registers 15 and 16 are gated out of the stages thereof, again under the control of a clock signal, into a conventional parallel adder 28 whereby the said adder 28 performs a single addition thereby to produce at its output a binary representation of the square of the number *abcd*.

It will be appreciated from the foregoing discussion that the particular circuit shown in Figure 1 includes gating means *7a–7d* for transferring signals from register 10 to the registers 15 and 16 as well as further gating means *8a–8g* and *9a–9g* for transferring the temporarily stored signals out of intermediate registers 15 and 16 into parallel adder 28. These gating means are normally controlled by appropriate clock sources (see Figure 1) thereby to effect the necessary timing in the overall circuit operation. For purposes of simplicity, the parallel adder 28 has not been illustrated in detail in Figure 1. An example of an adder suitable for use in the device of Figure 1 is illustrated and described in "Arithmetic Operations in Digital Computers," by R. K. Richards, published by D. Van Nostrand Co., Inc., New York, in 1955, page 83 et seq.

While the circuit shown in Figure 1 is particularly directed toward deriving the square of a four-digit number, it must be emphasized that the gating and combining logic inherent in the circuit of Figure 1 in fact applies directly to any binary number having N digits. It should further be noted that the circuit of Figure 1, comprising as it does an input register, intermediate register, a parallel adder, gating means, and timing sources, finds general application in deriving powers other than squares, and a similar such circuit may be developed, in accordance with considerations and techniques subsequently to be described, for deriving the binary cube, for instance, of a binary number. Moreover, the particular logical network shown in Figure 1, and utilized to effect final collapse of the overall register means, may be utilized in any squaring circuit wherein N is an even number, for, in this latter circuit, development of the binary factors will always produce a single extra factor which should be combined with another factor in achieving the desired register collapse. The utilization of a gate such as 22 and a half adder such as 23 represents a somewhat more complex logical combining circuit than is actually necessary, however, and a simpler circuit may in fact be employed for this portion of the overall network. Such a simplified circuit is illustrated in the arrangement of Figure 2 wherein the binary square of a six-digit number *abcdef* is derived.

Figure 2:
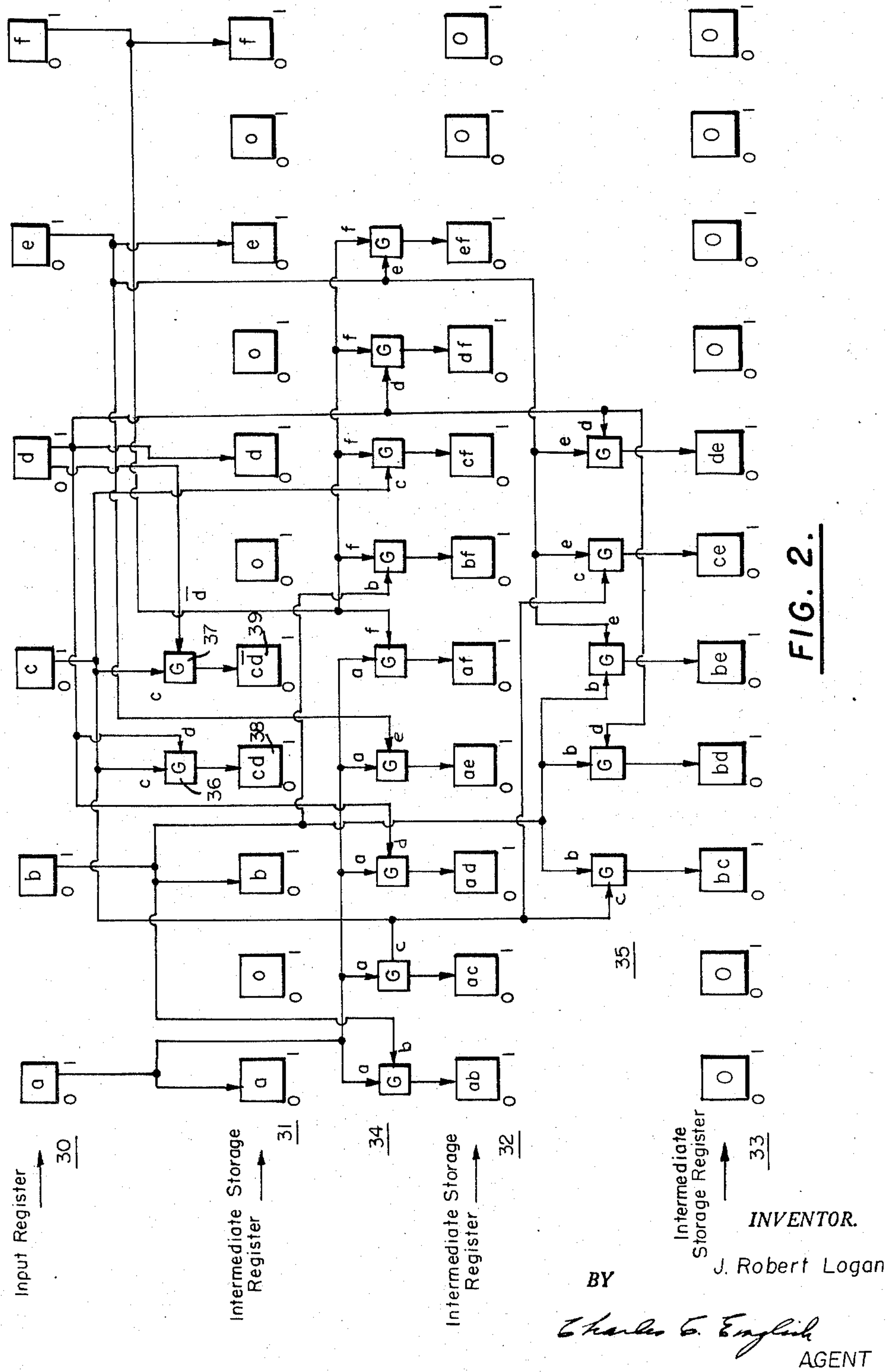
Figure 2 is a logical diagram of another form of binary power-taking circuit, adapted to effect the square of a six-digit binary number.

Again, before proceeding with the description of the circuit shown in Figure 2, the logic of the said circuit will be more readily appreciated by considering the actual factors which occur during the taking of a binary square. As before, it will be noted that the square of a six-digit number *abcdef* may be represented as follows:

$$(abcdef)^2=[a.2^5+b.2^4+c.2^3+d.2^2+e.2+f]^2$$

When the representation of the squared number is expanded, as before, a further table can be derived, as follows:

(4)

| $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|
| *a* | 0 | *b* | 0 | *c* | 0 | *d* | 0 | *e* | 0 | *f* |
| *ab* | *ac* | *ad* | *ae* | *af* | *bf* | *cf* | *df* | *ef* | 0 | 0 |
| 0 | 0 | *bc* | *bd* | *be* | *ce* | *de* | 0 | 0 | 0 | 0 |
| | | | | *cd* | | | | | | |

Examining the above table (4), it will be noted that except for the factor *cd* in the $2^6$ column, the logical network could take the form of an input register feeding three intermediate storage registers whereby the factors in the said intermediate storage registers could thereafter be summed in two parallel additions. This desirable situation can in fact be created by again producing further collapse of the table through a logical combining of the factors *c* and *cd* in the $2^6$ column.

Examining these two factors *c* and *cd*, and noting that when *c* equals "0," *cd* cannot equal "1," the following truth table may be derived:

(5)

| *c* | *cd* | Sum | Carry |
|---|---|---|---|
| 0 | 0 | 0 | 0 |
| 1 | 0 | 1 | 0 |
| 1 | 1 | 0 | 1 |

Referring now to the table (5), illustrating the relative states of the factors *c* and *cd*, it will be noted that the only time the sum of "1" occurs is when *c* equals "1" and *cd* equals "0" (i.e. *d* must, under these circumstances equal "0"). This particular sum of "1" condition can always be represented as $c\bar{d}$, i.e. a sum of "1" will be produced only when there is a "1" in the *c* place and a "0" in the *d* place of the input register. Moreover, further examining the table (5), it will be noted that the only time a carry of "1" occurs is when *c* equals "1" and *cd* equals "1" (i.e. *d* must, under these circumstances equal "1"). This latter carry of "1" situation can be represented as *cd* (i.e. before a carry of "1" occurs there must be binary "1's" in both the *c* and *d* places of the input register). Accordingly, the factor table given previously can be ultimately collapsed in the $2^7$ and $2^6$ columns thereby to eliminate the *cd* factor in the $2^6$ column thereof; and this ultimate collapse may be depicted as follows, with respect to the said $2^7$ and $2^6$ columns:

(6)

| $2^7$ | $2^6$ |
|---|---|
| *cd* | $c\bar{d}$ |
| *ae* | *af* |
| *bd* | *be* |

Returning now to the circuit of Figure 2, it will be noted that except for the aforementioned considerations relating to the ultimate collapse of the register into a minimum number of register stages, the overall arrangement for effecting the binary square of a six-digit number, *abcdef*, is essentially the same as the arrangement given with respect to Figure 1 for deriving the binary square of a four-digit number, *abcd*. In particular, the arrangement of Figure 2 again employs an input register 30 comprising six stages adapted to receive respectively the several digits *a* through *f*, representing the input number to be squared. The outputs of the several stages in input register 30 can be gated, as before, into appropriate stages of a first intermediate storage register 31, while various factors representing a logical combining of pairs of digits in input register 30 can be gated respectively into the stages of second and third intermediate storage registers 32 and 33.

The factors so gated into the stages of registers 32 and 33 are again passed to these stages under the control of a gating chain 34 disposed between input register 30 and the said second intermediate storage register 32, and under the control of a further gating chain 35 disposed between the said input register 30 and the said third intermediate storage register 33. For ease of understanding, the several digits utilized as inputs to the gates in chains 34 and 35 as well as the several factors appearing in the stages of registers 30 through 33, have been designated at appropriate locations in the logical representation of Figure 2.

In providing for the ultimate register collapse discussed previously and in place of the gate and half adder already described in reference to Figure 1, a circuit comprising gates 36 and 37 is employed between input register 30 and appropriate stages of the first intermediate register 31. Gate 36 comprises a coincidence gate having two inputs from the "1" output terminals of the *c* and *d* stages in input register 30, whereby a "1" is transferred via gate 36 into the stage 38 of storage register 31 only when the *c* and *d* digits are both "1." Similarly, gate 37 is of the coincidence type and has its two inputs derived, respectively from the "1" output terminal of the *c* stage in register 30, and from the "0" output terminal of the *d* stage in register 30, whereby the gate 37 transfers a "1" into register stage 39 of register 31 only when *c* equals "1" and *d* equals "0" (i.e. $\bar{d}$). Thus, the collapsed configuration shown in Figure 2 inserts the factor *cd* into register stage 38 rather than the factor "0," and inserts the factor $c\bar{d}$ into register stage 39 rather than the factor *c*; and this logical transfer of factors is in accordance with the collapsed configuration with respect to the $2^7$ and $2^6$ columns of the factor table (6) given above.

It will be noted that the logical network providing this ultimate collapse of the register comprises only two coincidence gates, namely, gates 36 and 37, and inasmuch as in the absence of the desired ultimate collapse register stage 38 would normally contain a "0," any "1" which is inserted into the said register stage 38 cannot possibly be propagated further.

It should further be noted, of course, that the logical circuit shown in Figure 2 would normally include a parallel adder, and would in addition include gating and clock means, similar to gates *7a–7d*, *8a–8g* and *9a–9g* of Figure 1, for transferring signals from input register 30 to intermediate registers 31, 32 and 33, and for thereafter transferring signals out of the said intermediate storage registers into the said parallel adder. For purposes of simplicity, these latter elements have not been illustrated in Figure 2. In operation, the signals in registers 31 and 32 would first be added in a first parallel addition, and the digits in register 33 would thereafter be added to the sum of this first parallel addition whereby the final desired binary square is achieved in two parallel additions. As has been discussed, therefore, the binary square of an N digit number, where N equals 6, has been achieved through the utilization of $$\frac{N}{2}$$

(i.e. three) intermediate registers, and this squaring technique has required only $$\frac{N}{2}-1$$

parallel additions (i.e. two parallel additions).

The logical combining circuit comprising gates 36 and 37 interconnected as shown, is preferred, due to its simplicity, over the gate and half adder configuration already discussed in reference to Figure 1. Moreover, as has already been discussed, this logical combining circuit comprising two gates may be utilized in effecting ultimate register collapse in any binary squaring circuit adapted to provide the square of any even digit number.

While the foregoing discussion with respect to Figure 2 has utilized letter representations, an example of the actual pulses which would occur in various portions of the system of Figure 2 will now be given to facilitate an understanding of the actual squaring process. For purposes of example, an arbitrary number 53, the square of which is 2809, may be represented as follows:

| | |
|---|---|
| Input register | 110101 |
| Intermediate storage registers | 10100010001 |
| | 10101101000 |
| | 00010000000 |
| Sum | 101011111001 |

Figure 3:
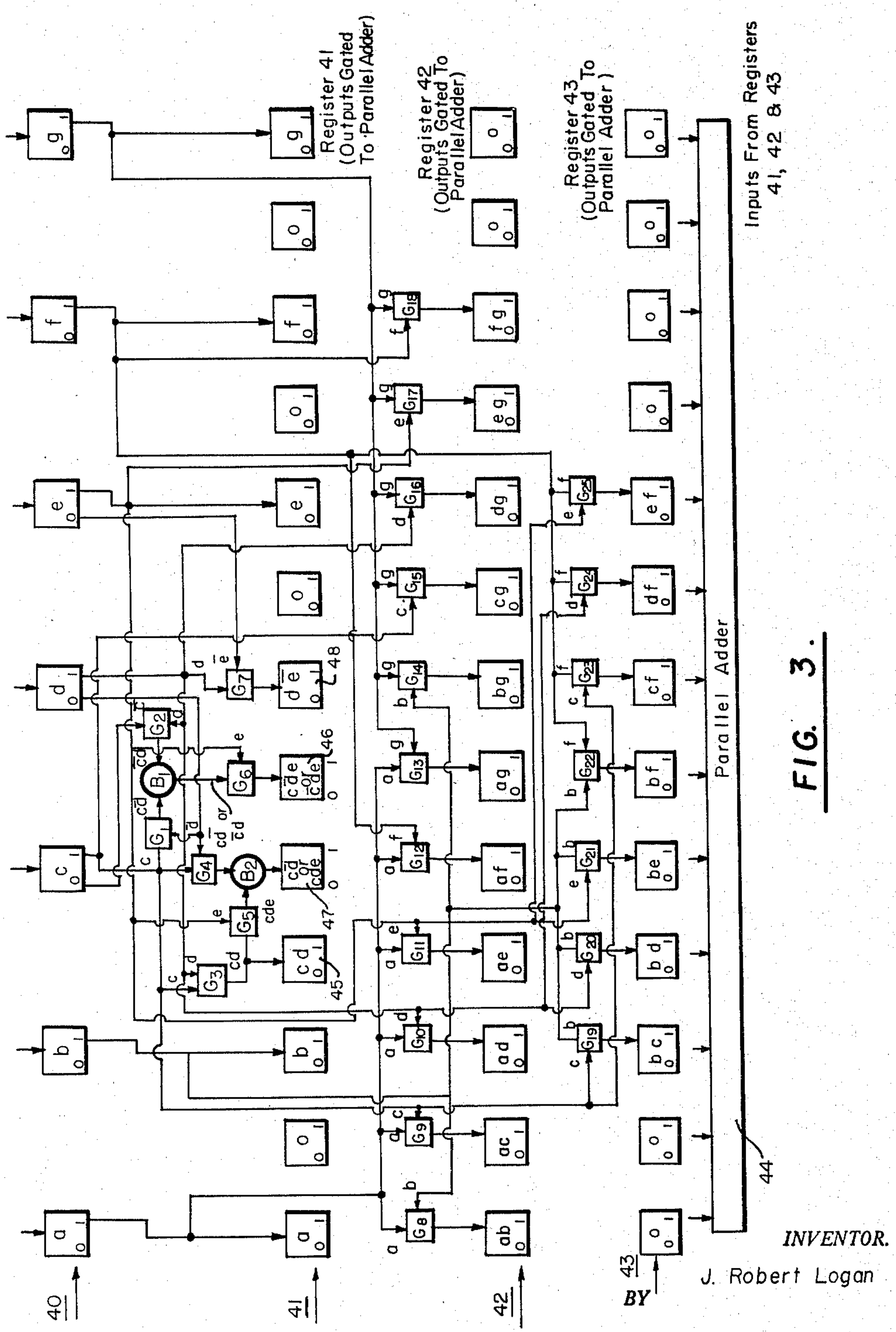
Figure 3 is a logical diagram of still another form of binary power-taking circuit, adapted to effect the binary square of a seven-digit binary number.

A somewhat more complex situation occurs when the input number to be squared has an odd number of digits, and the logical combining circuit as well as the overall squaring arrangement for one such odd input number condition is illustrated in Figure 3. Before proceeding with a detailed discussion of the circuit shown in Figure 3, however, it will again be convenient and helpful to examine the factor disposition which occurs during the squaring of an arbitrary number.

As has been discussed previously, the square of an arbitrary number, this time having an odd number of digits (e.g. seven), may be represented as follows:

$$[abcdefg]^2=[a.2^6+b.2^5+c.2^4+d.2^3+e.2^2+f.2^1+g]^2$$

The square of such a seven-digit number may, as before, be taken by adding the squares of the individual digits to twice the cross products of the several digits, and the factors produced during such a squaring technique can be represented in accordance with their various powers, by a table as follows:

(7)

| $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ |
|---|---|---|---|---|---|---|---|---|---|---|---|---|
| *a* | 0 | *b* | 0 | *c* | 0 | *d* | 0 | *e* | 0 | *f* | 0 | *g* |
| *ab* | *ac* | *ad* | *ae* | *af* | *ag* | *bg* | *cg* | *dg* | *eg* | *fg* | 0 | 0 |
| 0 | 0 | *bc* | *bd* | *be* | *bf* | *cf* | *df* | *ef* | 0 | 0 | 0 | 0 |
| -- | ---- | ---- | ---- | *cd* | *ce* | *de* | -- | -- | -- | -- | -- | -- |

It will be noted that in presenting the immediately preceding table (7), partial collapse of the register has been taken into account, but that three extra factors, namely, *cd*, *ce* and *de*, appear respectively in the $2^8$, $2^7$ and $2^6$ orders of the overall registers. This particular characteristic in fact arises whenever an odd digit binary number is factored during a squaring process; and in each such case of an odd number, three extra factors will appear, as opposed to the one extra factor which appears during the squaring of an even numbered digit. The several factors *cd*, *ce* and *de*, can again be logically combined with other factors to produce an ultimate collapse of the table into a minimum number of intermediate storage registers, and this collapse can occur as follows:

Examining first the $2^6$ and $2^8$ columns, the factors *d* and *de* and the factors *c* and *cd* in each of these columns can be combined with one another, precisely in accord with the logical combining already discussed in reference to Figure 2. In particular, the factors *d* and *de* in the $2^6$ column can be logically combined by inserting the factor $d\bar{e}$ in the $2^6$ order of the first register, and by placing the factor *de* in the normally "0" stage of the first register in the $2^7$ order. Similarly, the factors *c* and *cd* in the $2^8$ order can be logically combined by inserting the factors $c\bar{d}$ in the $2^8$ order of the first register, and by inserting the factor *cd* in the normally "0" stage in the $2^9$ order of the first register. This initial collapse can therefore be represented with respect to the $2^9$, $2^8$, $2^7$ and $2^6$ orders of the several registers, as follows:

(8)

| $2^9$ | $2^8$ | $2^7$ | $2^6$ |
|---|---|---|---|
| *cd* | $c\bar{d}$ | *de* | $d\bar{e}$ |
| *ae* | *af* | *ag* | *bg* |
| *bd* | *be* | *bf* | *cf* |
| ---- | ---- | *ce* | ---- |

When so collapsed initially, it will be noted that the only order which now has an extra digit is the $2^7$ order, and this particular order can be further collapsed by logically combining the factors *de* and *ce*. In particular, and referring to the said factors *de* and *ce*, the following truth table can be set up:

(9)

| | c | d | e | de | ce | Sum of de+ce | Carry of de+ce |
|---|---|---|---|---|---|---|---|
| Case 1 | 0 | 0 | 0 | 0 | 0 | 0 | 0 |
| Case 2 | 0 | 1 | 0 | 0 | 0 | 0 | 0 |
| Case 3 | 0 | 0 | 1 | 0 | 0 | 0 | 0 |
| Case 4 | 0 | 1 | 1 | 1 | 0 | 1 | 0 |
| Case 5 | 1 | 1 | 1 | 1 | 1 | 0 | 1 |
| Case 6 | 1 | 0 | 1 | 0 | 1 | 1 | 0 |
| Case 7 | 1 | 0 | 0 | 0 | 0 | 0 | 0 |
| Case 8 | 1 | 1 | 0 | 0 | 0 | 0 | 0 |

Referring now to the truth table (9) given immediately above, it will be noted that in combining the factors *de* and *ce*, the only times that a sum of binary "1" is placed in the $2^7$ stage of the first intermediate storage register corresponds to cases 4 and 6. These two cases can be represented logically as $\bar{c}de$ and as $c\bar{d}e$ (i.e., a binary "1" will be placed in the $2^7$ order only when the relative states of the binary digits *cde* are 011 or 101), and for all other cases, a sum of "0" is inserted in the said $2^7$ order. Moreover, referring to the truth table (9), it will be noted that the only time a carry of "1" can possibly occur is in case 5, and this particular case can be represented logically as *cde* (i.e. before a carry of "1" can possibly be transferred from the $2^7$ order to the $2^8$ order, each of the digits *c*, *d*, and *e* must be a binary "1"). Accordingly, the final collapse of the register with respect to the $2^9$, $2^8$, $2^7$, and $2^6$ orders thereof can be represented as follows:

(10)

| $2^9$ | $2^8$ | $2^7$ | $2^6$ |
|---|---|---|---|
| *cd* | $c\bar{d}$ or *cde* | $\bar{c}de$ or *cde* | $d\bar{e}$ |
| *ae* | *af* | *ag* | *bg* |
| *bd* | *be* | *bf* | *cf* |

A logical circuit adapted to provide the square of a seven-digit number and including means electrically providing the above discussed register collapse is illustrated in Figure 3. In particular, it will be noted that, as was the case in the arrangements of Figures 1 and 2, the binary squaring circuit comprises an input register 40 and a plurality of intermediate storage registers 41, 42 and 43 in combination with a parallel adder 44. A gating chain comprising gates G8 through G18 is disposed between input register 40 and intermediate storage register 42; and a further gating chain, comprising gates G19 through G25, is disposed between the input register 40 and intermediate storage register 43. As before, the several digits acting as gate inputs, as well as the several factors of the squaring process, are designated in Figure 3 at appropriate locations to facilitate an understanding of the gating arrangement.

The register collapse, discussed previously, may be accomplished through the utilization of a logical network comprising gates G1 through G7 and buffers B1 and B2; and the interconnections of these several components, as well as the logical signals appearing at various points in the combining circuit, are illustrated in Figure 3. Gate G7 has a pair of inputs, one of which is coupled to the "1" output terminal of register stage *d* in register 40, and the other of which is coupled to the "0" output terminal of register stage *e* in the said register 40, whereby a "1" output occurs from gate G7 only when *d* is a "1" and *e* is a "0." This factor $d\bar{e}$ is represented in stage 48 of register 41, and corresponds to the collapsed notation already discussed. Gate G3 has two inputs coupled respectively to the "1" output terminals of the *c* and *d* stages in register 40 whereby the output of gate G3 is a binary "1" only when *c* and *d* are both "1," and this factor, represented as *cd*, is inserted into stage 45 of register 41, again in accordance with the previous discussion. Gates G1 through G6, in combination with buffers B1 and B2, provide the desired logical inputs to register stages 46 and 47 in register 41, and the logical arrangement will in fact become readily apparent by considering the pulse state notations disposed adjacent the input and output of each of these gates and buffers. The output of gate G6 feeds register stage 46 whereby a "1" is inserted in the said stage 46 only for the pulse conditions $c\bar{d}e$ or $\bar{c}de$. Similarly, the output of buffer B2 feeds register stage 47 whereby a "1" is inserted in the said stage 47 only for the pulse conditions $c\bar{d}$ or *cde*. Again, these relationships with respect to the stages 46 and 47 correspond to the logical collapsing of the register network already discussed.

As has been discussed previously, the logical circuit comprising gates G1 through G7 in combination with buffers B1 and B2, effects the desired collapse of three factors, and inasmuch as three such factors occur during a squaring of any odd digit number, the particular logical circuit shown in Figure 3 may be utilized without further complication in a network adapted to provide the square of any odd digit number.

It will be appreciated, as before, that further gates and clock pulse sources, similar to gates *7a–7d*, *8a–8g* and *9a–9g* of Figure 1 should be provided to effect transfer of pulses from register 40 simultaneously into intermediate storage registers 41, 42 and 43, and that still another transfer network should be provided for effecting parallel outputs in sequence from intermediate storage registers 41, 42 and 43 to the parallel adder 44 which may be of the type mentioned in the description of Figure 1. The collapsed representation shown in Figure 3 again effects the squaring of a binary number with a minimum number of intermediate storage steps, and with a minimum number of parallel additions; and in the particular case of the seven-digit input number, the squaring is accomplished through utilization of three intermediate storage registers and two parallel additions.

By way of example, the pulse states in various portions of the circuit for an arbitrary input train, again chosen to represent the aforementioned number 53, can be represented as follows, and it will be appreciated that the designated sum appears at the output of the parallel adder shown in Figure 3:

| | |
|---|---|
| Input register | 0110101 |
| Intermediate storage registers | 0010110010001 |
| | 0000001101000 |
| | 0010100000000 |
| Sum | 00101011111001 |

While the foregoing discussion has thus been concerned with preferred embodiments in accordance with the present invention, many variations will be suggested to those skilled in the art. In particular, it will be noted that when register arrangements are employed, various register stages normally have "0's" therein regardless of the binary number being squared. If desired, these zero-containing register stages may be utilized to effect a relocation of the actual stages which contain certain factors, if such relocation is dictated by other considerations. Moreover, it will be appreciated that the use of intermediate storage registers is highly desirable due to the simplicity of the gating networks which can be employed for transferring signals from an input register, or from a plurality of input lines, into the said storage registers and thereafter into a parallel adder. However, other logical networks, in combination with appropriately timed control sources can be employed for transferring digits directly out of the input register into an accumulator.

For instance, referring to Figure 1 and adopting the alternate collapsing scheme already discussed in reference to Figures 2 and 3, the digits *abcd* can be gated out of the input register to the parallel adder as a first parallel train *a, bc,* $\overline{bc}$, 0, *c*, 0, *d*; and after this first train has been so gated into the parallel adder, the gating network may thereafter gate a second train out of the said input register, represented as *ab, ac, ad, bd, cd,* 0, 0. This successive transfer of parallel trains is in accord with the logical factors comprising the binary square already discussed, and a similar consideration applies, of course, to each of the other embodiments of the present invention.

The foregoing discussion has, of course, been primarily concerned with techniques and structures adapted to effect circuits capable of deriving the binary square of a binary number more simply and with fewer additions than has been the case heretofore. The essence of the present invention, as thus described, resides primarily in the provision of gating arrangements adapted to gate proper factors of the power-taking process to appropriate orders of a parallel adder at appropriate times; and in those forms of the invention wherein intermediate storage registers are employed, a further important part of the invention has resided in logically combining various factors with one another thereby to logically collapse the intermediate register stages to a desired minimum number of stages, thereby to decrease the number of register stages as well as the number of parallel additions which are required.

While the preceding discussion has, as mentioned, been concerned with the derivation of a binary square, these same considerations apply directly in the derivation of any binary power, and for that matter apply to the derivation of powers of numbers having other bases, such as ternary numbers. By way of example, a technique will now be described for producing a circuit capable of deriving a binary cube, and it will be appreciated that the following discussion employs the same techniques and considerations already utilized in producing circuits capable of deriving binary squares. It will further be noted from the following discussion, that by somewhat more refined treatment of the several gating means employed, a further effect of collapsing the addition fields is experienced beyond the mere superimposition of factors, already described.

Thus, employing the method by which the squaring devices of the present invention were previously explained, let us first consider the quantity (ABCD) as a binary field. This is effectively the sum of the components, as in $A+B+C+D$. Now the cube of this quantity is made up of the sum of the cubes of the components, three times the products of permuted squares and single factors, and six times the products of permuted single factors taking three at a time. Employing the technique already described, the following table can be set up to illustrate the factoring process:

(11)

| $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|
| | $A^3$ | | | $B^3$ | | | $C^3$ | | | $D^3$ |
| | | $3A^2B$ | $3AB^2$ | | | | | | | |
| | | | $3A^2C$ | | $3AC^2$ | | | | | |
| | | | | $3A^2D$ | | | $3AD^2$ | | | |
| | | | | | $3B^2C$ | $3BC^2$ | | | | |
| | | | | | | $3B^2D$ | | $3BD^2$ | | |
| | | | | | | | | $3C^2D$ | $3CD^2$ | |
| | | | | 6ABC | 6ABD | 6ACD | 6BCD | | | |

It should be noted that the quantities in table (11) have not been "collapsed" into their respective closed positions, and in fact these quantities may be rewritten in a more elementary form. In binary notation, the squares and cubes of a bit are merely the bits themselves, so the powers may be disregarded. Further, a multiplication by three may be accommodated by so duplicating the quantity that the "single" factor is the bit notation in one column, and the "double" factor is the same notation one column to the left. Also the factor of 6 may be reduced by shifting the bit notation one to the left, where it becomes a factor of 3, and proceeding therefrom as just described. Under this treatment, table (11) may be rewritten as follows:

(12)

| $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|
| | A | | | B | | | C | | | D |
| AB | | | AB | | | | | | | |
| | | AC | AC | AC | AC | | | | | |
| | | | AD | AD | | AD | AD | | | |
| | | | BC | | | BC | | | | |
| | | | | | BD | BD | BD | BD | | |
| | | | | | | CD | | | CD | |
| | | ABC | ABC | | | | | | | |
| | | | ABD | ABD | | | | | | |
| | | | | ACD | ACD | | | | | |
| | | | | | BCD | BCD | | | | |

The cube might be effected now by gating the input bits to appropriate register stages corresponding to table (12), as described, and adding directly. However, the number of additions required can be reduced appreciably by collapsing each column upward. The next step accordingly becomes one of logical collapsing, somewhat akin to the technique already described, in which single items were cut down in squaring devices.

It may be noticed that the fields to be collapsed lie to the left of the column headed $2^3$. Let us first consider column $2^4$, which is:

AD
BC
BD
CD
BCD or five separate items, and this may in fact readily be compressed to a total of two items. The factors BC and BD may, of course, be expressed in two columns as:

| | |
|---|---|
| BCD | $\begin{pmatrix} B\overline{C}D \\ BC\overline{D} \end{pmatrix}$ |

where the factors with the barred items are included in one bit position. Also notice that the original BCD item in the $2^4$ column may be included in this position as well. Now, AD and CD may be similarly compressed so that the whole expression may be expressed, using two columns (namely the $2^4$ and $2^5$ columns), as:

(13)

| | |
|---|---|
| BCD | $\begin{pmatrix} B\overline{C}D \\ BC\overline{D} \\ BCD \end{pmatrix}$ |
| ACD | $\begin{pmatrix} \overline{A}CD \\ A\overline{C}D \end{pmatrix}$ |

The barred factors in table (13) are, of course, binary zeros, and by reason of this collapse, gating may effect in two registers what was formerly contained in five.

Now, the next column to the left (column $2^5$) must have BCD and ACD in addition to its other factors so that it appears as:

BCD
ACD
AC
BD
ACD
ACD
BCD

But, since there is a doubling of factors here, this in turn may be expressed in two columns (namely the $2^5$ and $2^6$ columns), as:

(14)

| | |
|---|---|
| BCD<br>ACD | AC<br>BD |

with again a reduction to only two registers. Now, the $2^6$ column, including the cast-off BCD and ACD of table (14) is:

BCD
ACD
B
AC
AD
ABD
ACD

Note here that ACD appears twice; moreover, AC and AD may be expressed (see the development of table (13) above) as:

| | |
|---|---|
| ACD | $\begin{pmatrix} A\overline{C}D \\ AC\overline{D} \end{pmatrix}$ |

and a combining of BCD and ABD results in the factors:

| | |
|---|---|
| ABCD | $\begin{pmatrix} \overline{A}BCD \\ AB\overline{C}D \end{pmatrix}$ |

The total collapsing operation thus results in a compression of the $2^6$ column, into the $2^6$ and $2^7$ columns, as follows:

(15)

| | |
|---|---|
| ACD<br>ACD | ----------<br>$\begin{pmatrix} A\overline{C}D \\ AC\overline{D} \end{pmatrix}$ |
| --------<br>ABCD | B<br>$\begin{pmatrix} \overline{A}BCD \\ AB\overline{C}D \end{pmatrix}$ |

whereby the seven input factors have reduced to three.

Continuing the process, the $2^7$ column, with all the "carries" shown in table (15), becomes:

ACD
ACD
ABCD
AB
AC
AD
ABD
ABC
BC or a total of nine factors. Note again that the factor ACD can be shifted to the next, or $2^8$, column over as a duplicating factor.

Another ACD carry emerges from the combining of AC and AD, as has already been described, whereby these factors become:

ACD $\begin{pmatrix} A\overline{C}D \\ AC\overline{D} \end{pmatrix}$ and also AB and BC form:

ABC $\begin{pmatrix} \overline{A}BC \\ AB\overline{C} \end{pmatrix}$ while, finally, ABCD, ABD and ABC combine as:

ABCD $\begin{pmatrix} ABCD \\ AB\overline{C}D \\ ABC\overline{D} \end{pmatrix}$ so the total effect of the $2^7$ column collapsing operation is:

(16)

| | |
|---|---|
| ACD<br>ACD | ----------<br>$\begin{pmatrix} A\overline{C}D \\ AC\overline{D} \end{pmatrix}$ |
| ABC | $\begin{pmatrix} \overline{A}BC \\ AB\overline{C} \end{pmatrix}$ |
| ABCD | $\begin{pmatrix} ABCD \\ AB\overline{C}D \\ ABC\overline{D} \end{pmatrix}$ |

where the nine input factors have reduced to three in the $2^7$ column, and four carries are placed in the $2^8$ column.

In the same manner, the whole of column $2^8$, with carries, now becomes:

AC
ABC
ACD
ACD
ABC
ABCD which, with the duplication of ACD and ABC collapses at once to:

| | |
|---|---|
| ACD | AC |
| ABC | ABCD |

in the $2^8$ and $2^9$ columns. Column $2^9$ can easily accommodate these carries, so that the said $2^9$ column now appears as:

A
ACD
ABC

The completed cube logic contained in three registers is, therefore:

(17)

| | $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|---|
| Reg. One | AB | A | AC | $\begin{pmatrix} ABCD \\ AB\bar{C}D \\ ABC\bar{D} \end{pmatrix}$ | B | AC | $\begin{pmatrix} \bar{A}CD \\ A\bar{C}D \end{pmatrix}$ | C | BD | CD | D |
| Reg. Two | 0 | ABC | ABCD | $\begin{pmatrix} \bar{A}BC \\ AB\bar{C} \end{pmatrix}$ | $\begin{pmatrix} \bar{A}BCD \\ AB\bar{C}D \end{pmatrix}$ | BD | $\begin{pmatrix} B\bar{C}D \\ BC\bar{D} \\ BCD \end{pmatrix}$ | BD | 0 | 0 | 0 |
| Reg. Three | 0 | ACD | 0 | $\begin{pmatrix} A\bar{C}D \\ AC\bar{D} \end{pmatrix}$ | $\begin{pmatrix} A\bar{C}D \\ AC\bar{D} \end{pmatrix}$ | 0 | 0 | AD | 0 | 0 | 0 |

Table (17) above represents directly the gating technique as well as the register stages for three registers which may be employed in deriving the binary cube of a number ABCD. An overall circuit constructed in accordance with the logic of table (17) may, as before and in a manner similar to the circuits of Figures 1, 2 and 3, comprise: an input register adapted to receive the individual factors A, B, C, and D; gating means adapted to simultaneously transfer these factors from the input register into the appropriate stages of the three registers designated in table (17); and a parallel adder adapted to thereafter sum the factors in the said three registers in a total of two successive parallel additions.

Various gating networks will be suggested to those skilled in the art for transferring digits from an input register so that they appear as proper factors in appropriate stages of the intermediate register. By way of example, it should be noted that the gating network for transferring digits from the A, C and D positions of the input register to the $2^4$ stage of the first intermediate register, should be adapted to transfer a "1" into the said $2^4$ stage when the A, C and D digits are respectively 011 or 101. Similarly, the gating network which must be employed for transferring digits from the A, B, C and D positions of the input register to the $2^7$ stage of the first intermediate storage register should be such that a "1" is placed in the said $2^7$ stage of the first intermediate storage register when the input digits A, B, C and D are respectively 1111, 1101 or 1110. The requirements of the other portions of this gating network will similarly be readily apparent from an examination of table (17); and in fact the table (17) may be considered to represent directly the circuit of a binary cubing system expressed in mathematical terminology.

As mentioned previously, the several factors in the register stages, indicated in table (17), must be summed in two parallel additions to effect the ultimate binary cube of the input number. By way of example, let us consider that the input number ABCD is represented as 1011 (namely, decimal number 11), and that this number is to be cubed. The actual signals which would appear in the various register stages of table (17), and at the output of the binary adder employed in conjunction with these intermediate register stages, would appear as follows:

| | |
|---|---|
| Register one | 01100101011 |
| Register two | 00000000000 |
| Register three | 01000001000 |
| Binary sum | 10100110011 |

The binary sum given above corresponds to decimal number 1331 which is, of course, $11^3$.

Still other variations will be suggested to those skilled in the art, and it must therefore be stressed that the foregoing discussion is meant to be illustrative only and should not be considered limitative of my invention. All such variations and modifications as are in accord with the principles described are meant to fall within the scope of the appended claims.

Having thus described my invention, I claim:

1. In a logical binary powering circuit, input means for setting up a binary number of N digits, a plurality of K storage registers, where $$K=\frac{N}{2}$$

when N is an even number and $$K=\frac{N-1}{2}$$

when N is an odd number, first means for transferring signals representative of selected single ones of said N digits from said input means to selected ones of the stages in said K storage registers, second means for transferring signals representative of the logical combination of selected pairs of said N digits from said input means to other selected ones of the stages in said K storage registers, third means for transferring signals representative of the relative states of preselected ones of said N digits to still other ones of the stages in said K storage registers, and adder means operative subsequent to operation of said first, second, and third means for summing the signals in the said K storage registers in a total of $K-1$ parallel additions.

2. The combination of claim 1 wherein said input means comprises an input register.

3. The combination of claim 2 wherein each of said first, second, and third transferring means includes gating means.

4. The combination of claim 2 wherein said second transferring means comprises a plurality of coincidence gates, each of said gates having pairs of inputs coupled respectively to the outputs of different pairs of stages in said input register.

5. In a logical binary powering circuit, an input means for setting up a plural-digit binary number to be powered, accumulator means having a plurality of different orders respectively independent of one another, first gating means for transferring first signals representative of different individual digits of said plural-digit binary number to first selected orders of said accumulator means, second gating means for transferring second signals representative of the logical combinations of different pairs of said plural digits to second selected orders of said accumulator means, and third gating means for transferring third signals representative of the comparative digit states of a logically combined preselected pair of said digits and of a preselected single digit in said plural-digit number to third selected orders of said accumulator means, whereby the output of said accumulator means comprises a binary number representative of the square of said input plural-digit binary number.

6. The combination of claim 5 wherein said plural-digit binary number has an odd number of digits, said third means including means responsive to the comparative digit states of different preselected pairs of said plural-digit number.

7. The combination of claim 5 wherein said input means comprises a plural-stage input storage register.

8. The combination of claim 7 wherein said first, second and third transferring means include coincidence gating means.

9. The combination of claim 8 wherein said accumulator means comprises a plurality of intermediate storage registers having a plurality of storage stages independent of one another, the inputs of said plural stages being coupled respectively to outputs of said input storage register via said coincidence gating means, and a parallel adder having inputs thereof coupled to the output of said intermediate storage registers.

10. In a logical binary powering circuit, an input register, means coupling a binary number to said input register, a plurality of intermediate storage registers, first means transferring a plurality of first signals from said input register to a preselected plurality of different stages of said intermediate storage registers respectively, said first signals being representative respectively of different preselected individual digits of said binary number, second means transferring a plurality of second signals from said input register to another preselected plurality of different stages of said intermediate storage registers respectively, said second signals being representative respectively of the logical combination of different pluralities of digits comprising said binary number, and adder means for adding together the digit-representing signals in different ones of said plurality of intermediate storage registers.

11. The combination of claim 10 wherein said first and second means comprise simultaneously operative gating means.

12. The combination of claim 10 wherein said binary number comprises N digits, said plurality of intermediate storage registers being K in number, where $$K=\frac{N}{2}$$

when N is an even number, and $$K=\frac{N-1}{2}$$

when N is an odd number.

13. The combination of claim 12 wherein said adder means comprises a parallel adder adapted to perform $K-1$ successive additions, whereby the output of said parallel adder comprises the square of the said binary number coupled to said input register.

14. In a logical powering circuit, input means comprising a plurality of distinct input lines, means for setting up, on said input lines, the different individual digits of a multi-digit number to be powered, accumulator means, first gating means for transferring a plurality of independent first signals representative respectively of different selected individual ones of said digits from said input lines to said accumulator means, second gating means responsive to the relative signal states of digits on different ones of said input lines for transferring a plurality of independent second signals, representative respectively of the logical combinations of different pluralities of said digits, from said input lines to said accumulator means, said accumulator means being operative to sum said first and second signals whereby the output of said accumulator means comprises the power of said multi-digit number.

15. The combination of claim 14 wherein said input lines comprise the outputs of a plural-stage input register.

16. The combination of claim 15 wherein said accumulator means comprises a plurality of intermediate storage registers, and a parallel adder coupled to the outputs of said intermediate storage registers.

17. In a logical powering circuit, a plural-stage input register adapted to receive input signals representative of the digits of a number to be powered, a plurality of plural-stage intermediate storage registers, gating means for transferring said input signals from said input register to first preselected stages of said intermediate storage registers, said gating means including means responsive to the comparative signal states of digits in preselected different stages of said input register for transferring further signals to second preselected stages of said intermediate storage registers representative respectively of different logical combinations of the signals in said preselected different stages of said input register, and means for adding the signals in said intermediate storage registers in parallel.

18. In a logical binary powering circuit, an input means for setting up a plural-digit binary number to be powered, said input means comprising a plural stage storage register each stage of which has a "1" output terminal and a "0" output terminal, accumulator means having a plurality of different orders, first means for transferring first signals representative of different digits of said plural-digit binary number to different selected orders of said accumulator means, second means for transferring second signals representative of the logical combinations of different pairs of said plural digits to different selected orders of said accumulator means, and third means for transferring third signals representative of the comparative digit states of a logically combined preselected pair of said digits and of a preselected single digit in said plural-digit number to different selected orders of said accumulator means, whereby the output of said accumulator means comprises a binary number representative of the square of said input plural-digit binary number, said third transferring means including first and second coincidence gates, means respectively coupling the inputs of said first coincidence gate to the "1" output terminals of a preselected pair of stages in said plural stage storage register, means respectively coupling the inputs of said second coincidence gate to the "1" output terminal of one of said preselected pair of stages, and to the "0" output terminal of the other of said preselected pair of stages, and means coupling the outputs of said first and second gates to preselected adjacent orders in said accumulator means.

19. In a logical binary powering circuit, input means for setting up a plural-digit binary number to be powered, first and second plural stage storage registers, first means for transferring first signals representative respectively of individual ones of said plural digits to different spaced stages of said first register, second means for transferring second signals representative respectively of logical combinations of different pairs of said plural digits to different selected stages of said second register, third means for transferring a third signal representative of the relative states of preselected ones of said plural digits to a stage of said first register located between selected ones of said spaced stages, and adder means operative subsequent to operation of said first, second, and third transferring means for summing the signals in said first register in parallel with the signals in said second register.

20. The combination of claim 19 including clock means for causing said first, second and third transferring means to operate simultaneous with one another.

21. In a logical binary powering circuit, input means for setting up a plural-digit binary number to be powered, means responsive to selected ones less than all of said plural digits for producing first signals representative respectively of said selected digits, means responsive to the remaining ones of said plural digits for producing second signals representative of the comparative states of said remaining digits and of others of said plural digits, means responsive to said plural digits for producing third signals representative respectively of logical combinations of selected pluralities of said plural digits, register means, first gating means for simultaneously transferring said first, second and third signals to different preselected stages of said register means respectively, adder means, and second gating means operative subsequent to said first gating means for transferring said first, second, and third signals from said register means to said adder means wherein said signals are summed in accordance with their relative positions in said register means.

22. In a logical powering circuit, a plurality K of plural stage storage registers, the successive stages of each of said registers being representative respectively of successive mathematical powers to a preselected base, each of said registers having mathematical power-representing stages corresponding to stages representing like mathematical powers in others of said registers, input means providing an N digit number to be powered, gating means responsive to the several digits of said N digit number for transferring signals, representative of the coefficients of a mathematical powering expansion of said N digit number, to the several power-representing stages of said plural registers in accordance with the several powers of said expansion, at least one power-representing stage in at least one of said registers normally having no signal transferred thereto by said gating means, logical means responsive to the relative states of a preselected plurality of said N digits for transferring an auxiliary signal representative of said relative states to said one stage whereby all the factors of said mathematical expansion are stored in the several stages of said K registers, where $$K=\frac{N}{2}$$

when N is an even number and $$K=\frac{N-1}{2}$$

when N is an odd number, and means operative subsequent to operation of said gating and logical means for summing the signals stored in said K registers to produce an output signal representative of the desired power of said N digit number.

References Cited in the file of this patent

UNITED STATES PATENTS

| | | |
|---|---|---|
| 2,404,047 | Flory et al. | July 16, 1946 |
| 2,764,343 | Diener | Sept. 25, 1956 |

OTHER REFERENCES

Richards: Arithmetic Operations in Digital Computers, D. Van Nostrand Co., Inc., Princeton, New Jersey; copyright February, 1955, pages 138 to 140.

UNITED STATES PATENT OFFICE

Certificate of Correction

Patent No. 2,890,829

June 16, 1959

J Robert Logan

It is hereby certified that error appears in the printed specification of the above numbered patent requiring correction and that the said Letters Patent should read as corrected below.

Column 9, line 20, after "intermediate" insert —storage—; line 31, for "(i.e. *d*)" read —(i.e. $\bar{d}$)—; column 10, line 73, for "factors" read —factor—; column 15, line 46, strike out "ACD".

Signed and sealed this 1st day of March 1960.

[SEAL]

Attest:
KARL H. AXLINE,
*Attesting Officer.*

ROBERT C. WATSON,
*Commissioner of Patents.*